(12) United States Patent
Lu

(10) Patent No.: US 8,490,948 B2
(45) Date of Patent: Jul. 23, 2013

(54) APPARATUS FOR FLOW CONTROL AND SHUTOFF

(76) Inventor: Qi-jun Lu, Yuyao (CN)

( * ) Notice: Subject to any disclaimer, the term of this patent is extended or adjusted under 35 U.S.C. 154(b) by 315 days.

(21) Appl. No.: 13/013,914

(22) Filed: Jan. 26, 2011

(65) Prior Publication Data

US 2012/0187320 A1 Jul. 26, 2012

(51) Int. Cl.
*F16K 5/00* (2006.01)

(52) U.S. Cl.
USPC ......... 251/311; 239/581.1; 239/526; 251/312

(58) Field of Classification Search
USPC ......... 251/309–312, 298, 301, 192, 181–183, 251/235; 239/526, 581.1, 586
See application file for complete search history.

(56) References Cited

U.S. PATENT DOCUMENTS

| | | | |
|---|---|---|---|
| 6,073,863 A * | 6/2000 | Wang | 239/525 |
| 6,213,149 B1 * | 4/2001 | Moner | 137/556.3 |
| 6,367,716 B1 * | 4/2002 | Wang | 239/526 |
| 6,571,960 B2 * | 6/2003 | Williamson et al. | 210/420 |
| 7,240,858 B2 * | 7/2007 | Wang | 239/526 |
| 7,328,860 B1 * | 2/2008 | Chen | 239/581.1 |
| 7,429,029 B2 * | 9/2008 | Wang | 251/309 |
| 8,087,597 B2 * | 1/2012 | Cheng | 239/526 |
| 8,123,151 B2 * | 2/2012 | Cheng | 239/586 |
| 2006/0249599 A1 * | 11/2006 | Guo | 239/530 |
| 2011/0127356 A1 * | 6/2011 | Hsu | 239/526 |

\* cited by examiner

*Primary Examiner* — John K Fristoe, Jr.
*Assistant Examiner* — Marina Tietjen
(74) *Attorney, Agent, or Firm* — IPro, Inc.; Na Xu

(57) ABSTRACT

An apparatus for flow control and shutoff comprises a body having a chamber, an inlet and an outlet, the inlet and the outlet in fluidic communication with the chamber; the said apparatus for flow control and shutoff further comprises a flow regulator comprising a channel and the flow regulator rotatably fit in the chamber, such that the flow regulator is rotatable between a first rotational position and a second rotational position and that the channel is in fluidic communication with at least one of the inlet and the outlet; the said apparatus for flow control and shutoff further comprises a lever operably connected to the flow regulator such that the lever urges the flow regulator to rotate between a first rotational position and a second rotational position in the chamber when a user of the apparatus pushes the lever. At the first rotational position, the channel is not in fluidic communication with at least one of the inlet and the outlet, such that fluidic communication between the inlet and the outlet is blocked. The flow regulator is operable to regulate a flow rate between the inlet and the outlet when the flow regulator is rotated between the first and the second rotational positions.

16 Claims, 5 Drawing Sheets

APPARATUS FOR FLOW CONTROL AND SHUTOFF

BACKGROUND

Spray nozzles are used to distribute and disperse liquids such as water in many applications. Garden hose nozzles are a type of typical spray nozzles used as garden tools. Garden hose nozzles currently available on the market often include an individual subassembly for flow control and a separate individual subassembly for shutoff control, such as a shutoff valve or lever. The aforementioned garden hose nozzles are manufactured with a tight connection of all the subassembly parts to avoid any potential liquid leakage during usage.

SUMMARY OF INVENTION

Described herein is an apparatus for flow control and shutoff, comprising: a body comprising a chamber, an inlet and an outlet, the inlet and the outlet in fluidic communication with the chamber; the said apparatus for flow control and shutoff further comprises a flow regulator comprising a channel and the flow regulator rotatably fit in the chamber, such that the flow regulator is rotatable between a first rotational position and a second rotational position and that the channel is in fluidic communication with at least one of the inlet and the outlet; the said apparatus for flow control and shutoff further comprises a lever operably connected to the flow regulator such that the lever urges the flow regulator to rotate between a first rotational position and a second rotational position in the chamber when a user of the apparatus pushes the lever; wherein at the first rotational position, the channel is not in fluidic communication with at least one of the inlet and the outlet, such that fluidic communication between the inlet and the outlet is blocked; wherein the flow regulator is operable to regulate a flow rate between the inlet and the outlet when the flow regulator is rotated between the first and the second rotational positions.

According to an embodiment of the apparatus, the flow regulator has at least one groove configured to accommodate at least one o-ring operable to form a seal between the flow regulator and the chamber.

According to an embodiment of the apparatus, the flow regulator further comprises at least one positioning ridge or at least one positioning tip, or the combination of the positioning ridge and the positioning tip, for operably connecting to the lever.

According to an embodiment of the apparatus, the flow regulator has two end sections with different diameters, configured to allow unidirectional assembly of the flow regulator into the chamber.

According to an embodiment of the apparatus, the flow regulator comprises a recess and a resilient piece is housed therein, wherein the resilient piece is configured to completely seal at least one of the inlet and the outlet when the flow regulator is at the first rotational position.

According to an embodiment of the apparatus, the body comprises at least one groove surrounding the outlet configured to accommodate at least one o-ring.

According to an embodiment of the apparatus, the body comprises at least one groove surrounding the inlet configured to accommodate at least one o-ring.

According to an embodiment of the apparatus, the body comprises a protrusion configured to support the lever.

According to an embodiment of the apparatus, the inlet comprises at least one claw for assembly with adjoining parts of a spray nozzle.

According to an embodiment of the apparatus, the body comprises at least one mechanism configured to restrict rotational motion of the flow regulator to be between the first rotational position and the second rotational position.

According to an embodiment of the apparatus, the said mechanism comprises at least one step in a sidewall of the chamber.

According to an embodiment of the apparatus, the lever comprises at least one extension portion operably connectable to the flow regulator.

According to an embodiment of the apparatus, the lever comprises at least one top portion configured to be pushed by a user.

According to an embodiment of the apparatus, the lever comprises anti-slip grooves.

According to an embodiment of the apparatus, at least one extension portion comprises at least one through hole configured to connect to a positioning tip of the flow regulator.

DETAILED DESCRIPTION

Figure 1:
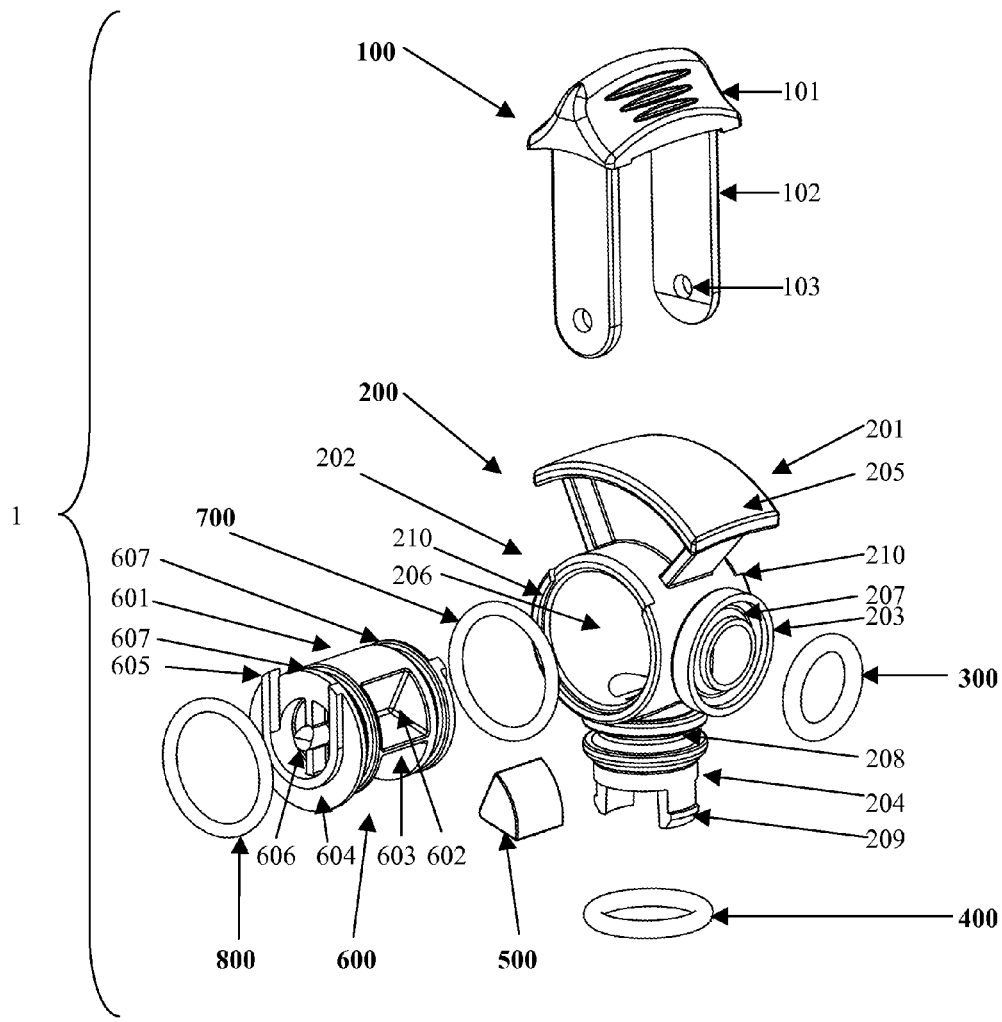
FIG. 1 is an explosion view of components in an apparatus for flow control and shutoff control.

As shown in the drawings FIG. 1 to FIG. 6, one embodiment of a dual function flow control and shutoff apparatus 1, as described below, may include a lever 100, a body 200, an o-ring 300, an o-ring 400, a resilient piece 500, a flow regulator 600, an o-ring 700 and an o-ring 800.

As shown in FIG. 1, the lever 100 can be a molded single piece made of one or more materials suitable for mold casting or injection molding, such as polymers, plastics, metals, rubbers, foams or any other suitable materials. The lever 100 can comprise a top portion 101, two extension portions 102 and at least one hole 103 in each of the extension portions 102. A user can push the top portion 101 of the lever 100 with a thumb. The top portion 101 can comprise a ridged surface with anti slip grooves. The top portion 101 can have two long edges parallel to the anti slip grooves, and two short edges substantially perpendicular to the long edges. The extension portions 102 can be two flat pieces substantially parallel to each other and extending substantially downwardly from the top portion 101. The hole 103 can be a through hole positioned near an end of each extension portion 102 away from the top portion 101. The lever 100 is operably connectable to the flow regulator 600, preferably with the holes 103.

As shown in FIG. 1, the body 200 can be a molded single piece made of one or more materials suitable for mold casting or injection molding, such as polymers, plastics, metals, rubbers, foams or any other suitable materials. The body 200 can have a protrusion 201, a chamber 202, an outlet 203 and an inlet 204, the inlet 204 and the outlet 203 being in fluidic communication with the chamber 202. The protrusion 201 can have a curved upper surface 205 and is configured to support the lever 100. The upper surface 205 can have two long curved edges and two short edges.

The chamber 202 can be cylindrically shaped with an inside diameter sized to fit the flow regulator 600 therein. The chamber 202 can have one or two body openings 206. The outlet 203 and inlet 204 are open to an interior of the chamber 202 and are in fluidic communication to the chamber 202.

The outlet 203 can comprise an o-ring groove 207 surrounding the outlet 203. The inlet 204 can comprise an o-ring groove 208 surrounding the inlet 204. The o-ring grooves 207 and 208 are configured to accommodate the o-ring 300 and o-ring 400 therein, respectively. The inlet 204 can have at least one claw 209 for assembly with adjoining parts of a spray nozzle.

The body 200 can have at least one mechanism configured to restrict rotational motion of the flow regulator 600. For example, each of the opening 206 has two steps 210 and a recessed edge therebetween. When the apparatus is assembled, the extension portions 102 of the lever 100 is disposed between the steps 210 and the steps 210 restrict rotational motion of the flow regulator 600 by restricting movement of the lever 100.

The flow regulator 600 can be a molded single piece made of one or more materials suitable for mold casting or injection molding, such as polymers, plastics, metals, rubbers, foams or any other suitable materials. The flow regulator 600 can have a middle section 601 with a partial sidewall forming a portion of a cylindrical shape, and two end sections 604. The middle section 601 can comprise a recess 602 and a channel 603. The middle section 601 is sized to fit snugly into the chamber 202. The middle section 601 has two grooves 607 near the end sections 604 for accommodating an o-ring 700 and an o-ring 800 respectively. The o-rings 700 and 800 are configured to form a seal between the flow regulator 600 and the chamber 202.

The recess 602 can have any suitable size and shape to house the resilient piece 500 therein. The resilient piece 500 can be a molded single piece made of resilient materials suitable for forming a seal, such as rubbers, plastics, polymer or any other suitable materials. The resilient piece 500, when the apparatus is fully assembled, is configured to completely seal at least one of the inlet 204 and the outlet 203 when the flow regulator 600 is at a certain rotational position relative to the chamber 202. The resilient piece 500 may be of any suitable shape, such as a wedge.

The channel 603 is in fluidic communication with at least one of the outlet 203 and the inlet 204 when the flow regulator 600 is assembled into the chamber 202 and between a first rotational position and a second rotational position.

The two end sections 604 may have different diameters configured to allow unidirectional assembly of the flow regulator 600 into the chamber 202. For instance, one of the two end sections 604 may has a diameter sized to fit snugly through the openings 206 and into the chamber 202; while the other of the end sections 604 may has a diameter slightly larger than that of the openings 206.

Each of the two end sections 604 can have a positioning ridge 605 and a positioning tip 606 on its end surface. The positioning ridge 605 can be configured to enable the lever 100 to cause rotational motion of the flow regulator 600, when a user pushes the lever 100. For example, the positioning ridge 605 can have a contour matching a contour of one of the extension portions 102 of the lever 100. When the lever 100 is assembled on the flow regulator 600, the extension portion 102 can push against the positioning ridge 605 such that the lever 100 causes rotational motion of the flow regulator 600. The positioning ridge 605 may have any suitable contour, such as a U-shape contour. The positioning tip 606 can fit in the through hole 103 and is configured to prevent the lever 100 from detaching from the flow regulator 600. The positioning tip 606 may be of any suitable cross-sectional shape, such as a circular shape, an oval shape, a polygonal shape.

Figure 2:
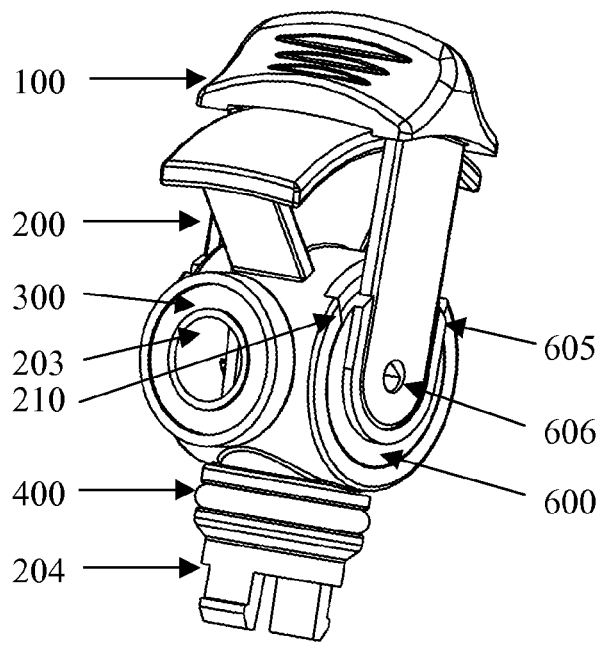
FIG. 2 is a perspective view of the apparatus of FIG. 1.
Figure 3:
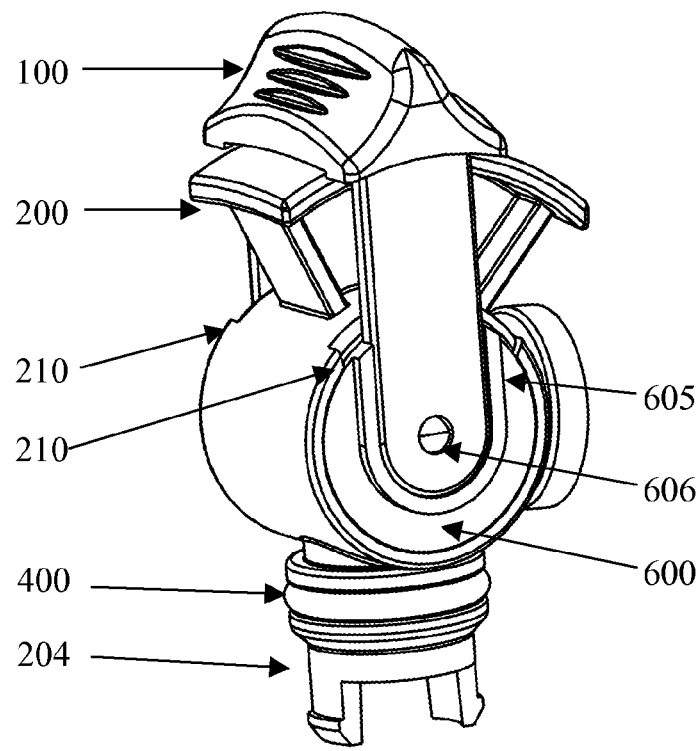
FIG. 3 is a perspective view of the apparatus of FIG. 1.

As shown in FIG. 2 and FIG. 3, the flow regulator 600, with o-ring in grooves 607 and the resilient piece 500 in the recess 602, may rotatably fit into the body opening 206 of the chamber 202. To ensure a proper assembly, the flow regulator 600 is positioned with the resilient piece 500 directly facing the outlet 203, and as such the positioning ridge 605 opens toward the protrusion 201. Furthermore, the lever 100 may slide downward on the body 200, with each of its extensions 102 fitting into the positioning ridge 605, and the holes 103 clicked on to the positioning tip 606, completing the assembling of the flow control and shutoff apparatus.

Figure 4:
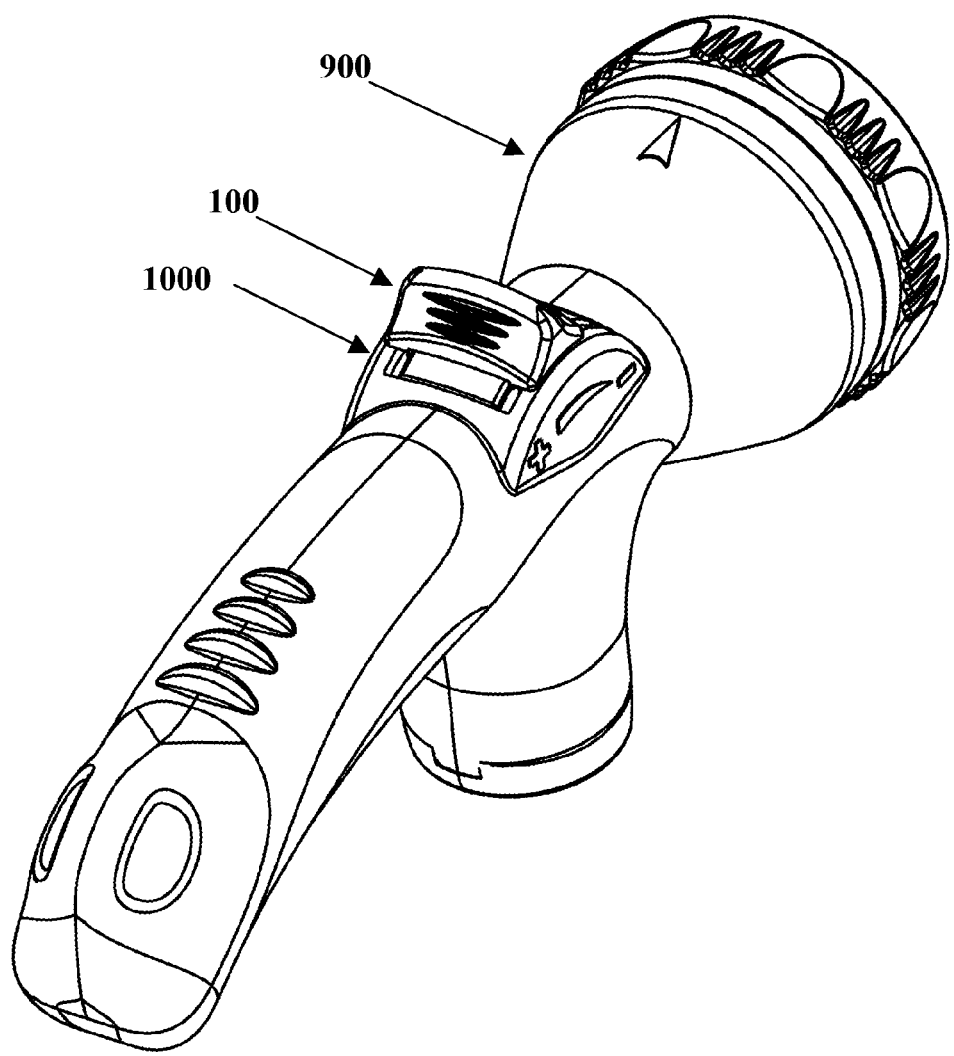
FIG. 4 is perspective view of a garden hose nozzle with the apparatus of FIG. 1 assembled therein.

As shown in FIG. 4, the dual function flow control and shutoff apparatus can be further assembled into a nozzle body 1000, with the outlet 203 open into a nozzle head 900. The nozzle head 900 can be any suitable nozzle head, for example a multi-pattern nozzle head that is adjustable in order to select from a plurality of spray patterns.

In this assembled nozzle, the flow control and shutoff apparatus functions when the lever 100 is pushed by a user of the nozzle toward the nozzle head 900 and away from the nozzle head 900.

Figure 5:
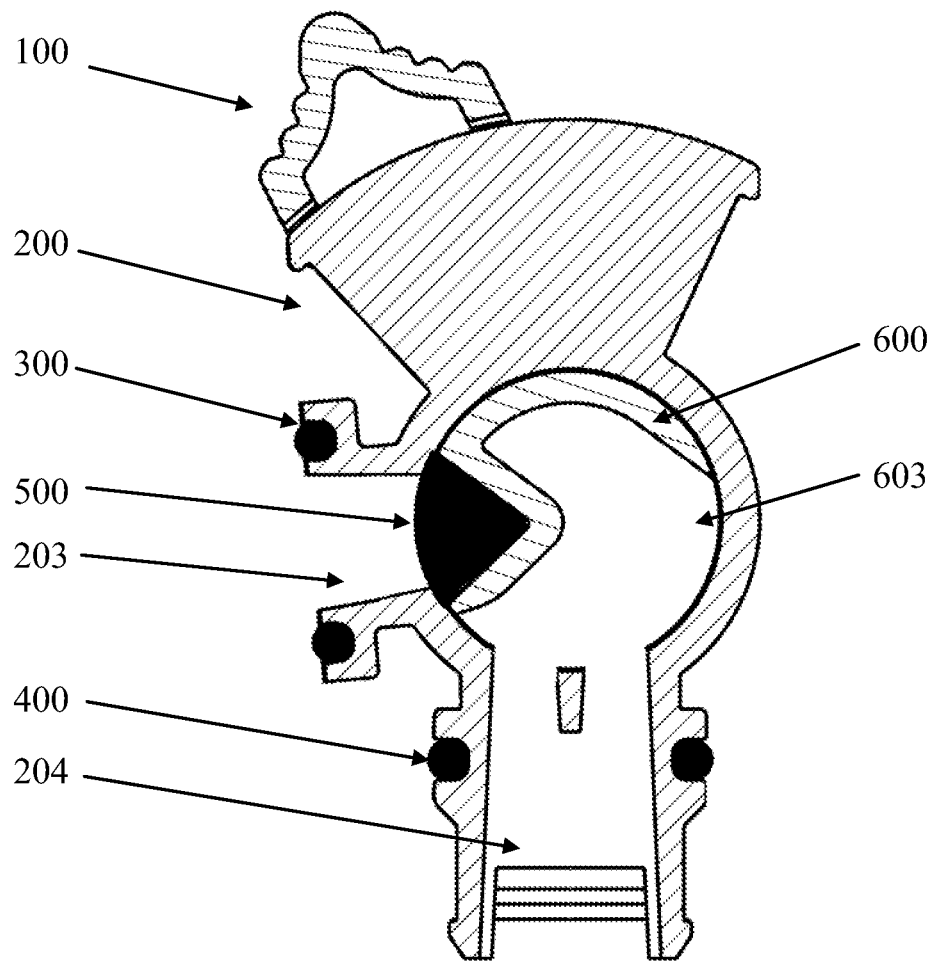
FIG. 5 is a cross-sectional view of the apparatus of FIG. 1 at a first rotational position.

When the lever 100 is at the first rotational position, the channel 603 is not in fluidic communication with at least one of the inlet and the outlet, such that fluid communication between the inlet and the outlet is shutoff. In this implementation, as shown in FIG. 5, at the first rotational position, the channel 603 is not in fluidic communication with the outlet 203 as the resilient piece 500 seals the outlet 203, which serves to shutoff water flow from the inlet 204 to the outlet 203 completely. Therefore, the first rotational position is the OFF position for the nozzle. Thus, the shutoff control function is realized with the dual function flow control and shutoff apparatus.

Figure 6:
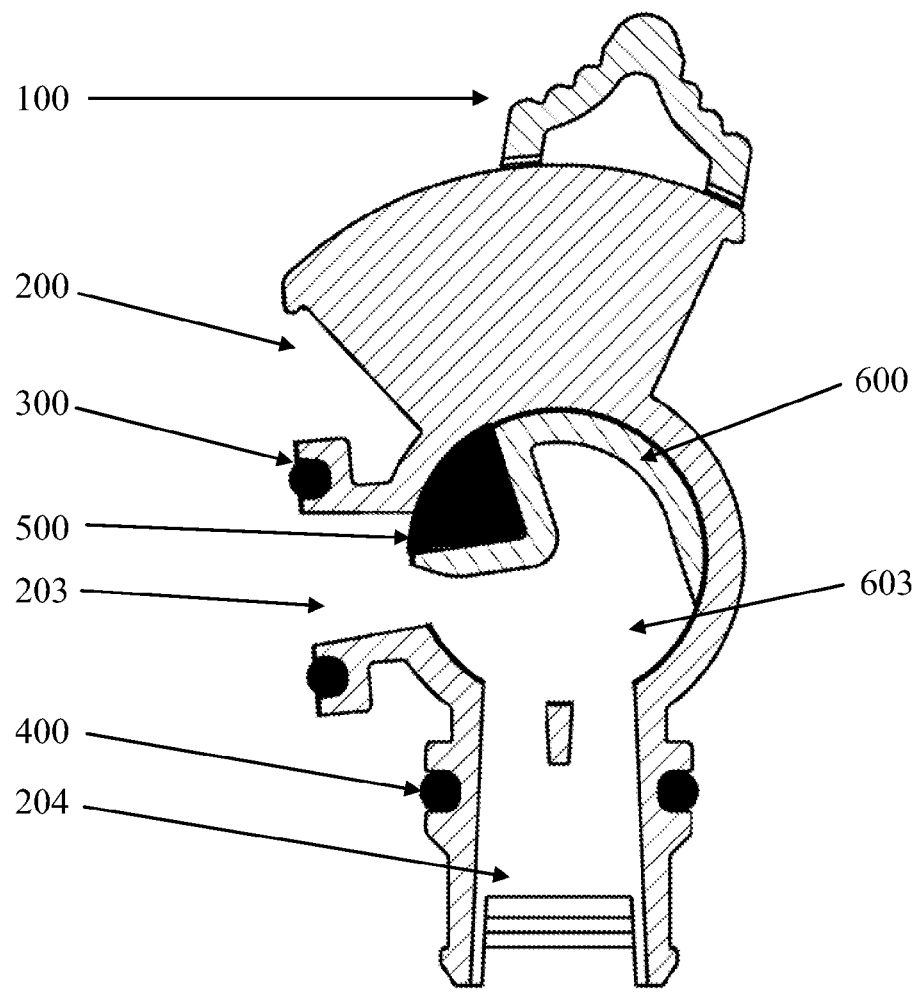
FIG. 6 is a cross-sectional view of the apparatus of FIG. 1 at a second rotational position.

When the lever is pushed by a user between the first and the second rotational position, the flow regulator is operable to change a flow rate between the inlet and the outlet. In this implementation, as the flow regulator rotates with the lever, the resilient piece 500 overlaps less and less with the outlet 203, which allows increased flow while the channel 603 is in fluidic communication with the inlet 204 and the outlet 203; therefore the flow rate is increased. When the lever is at the second rotational position, as shown in FIG. 6, the flow rate is at its maximal level. Thus the flow control function is realized with the dual function flow control and shutoff apparatus.

While the apparatus for flow control and shutoff has been described in detail with reference to specific embodiments thereof, it will be apparent to those skilled in the art that various changes and modifications can be made, and equivalents employed, without departing from the scope of the appended claims.

I claim:

1. An apparatus for flow control and shutoff, comprising:
a body comprising a chamber, an inlet and an outlet, the inlet and the outlet in fluidic communication with the chamber; wherein the body is configured to fit into a nozzle that houses the apparatus for flow control and shutoff; wherein the outlet is configured to be in fluid communication with a nozzle head and the inlet is configured to be in fluid communication with a nozzle inlet when the apparatus is assembled into the nozzle;
a flow regulator comprising a channel and the flow regulator rotatably fit in the chamber, such that the flow regulator is rotatable between a first rotational position and a second rotational position and that the channel is in fluidic communication with at least one of the inlet and the outlet; wherein the flow regulator further comprises at least one positioning ridge on an end section of the flow regulator; and a lever operably connected to the flow regulator such that the lever urges the flow regulator to rotate between a first rotational position and a second rotational position in the chamber when a user of the apparatus pushes the lever; wherein the lever comprises at least one extension portion operably connectable to the flow regulator;

wherein at the first rotational position, the channel is not in fluidic communication with at least one of the inlet and the outlet, such that fluidic communication between the inlet and the outlet is blocked;

wherein the flow regulator is operable to regulate a flow rate between the inlet and the outlet when the flow regulator is rotated between the first and the second rotational positions; and wherein the positioning ridge is configured to enable the lever to cause rotational motion of the flow regulator, and the positioning ridge has a contour matching a contour of one of the extension portions of the lever.

2. The apparatus of claim 1, wherein the flow regulator has at least one groove configured to accommodate at least one o-ring operable to form a seal between the flow regulator and the chamber.

3. The apparatus of claim 1, wherein the flow regulator further comprises at least one positioning tip for operably connecting to the lever.

4. The apparatus of claim 1, wherein the flow regulator has two end sections with different diameters, configured to allow unidirectional assembly of the flow regulator into the chamber.

5. The apparatus of claim 1, wherein the flow regulator comprises a recess and a resilient piece housed therein, wherein the resilient piece is configured to completely seal at least one of the inlet and the outlet when the flow regulator is at the first rotational position, and wherein the resilient piece is wedge shaped and is made of resilient material.

6. The apparatus of claim 1, wherein the body comprises at least one groove surrounding the outlet configured to accommodate at least one o-ring.

7. The apparatus of claim 1, wherein the body comprises at least one groove surrounding the inlet configured to accommodate at least one o-ring.

8. The apparatus of claim 1, wherein the body comprises a protrusion configured to support the lever.

9. The apparatus of claim 1, wherein the inlet comprises at least one claw for assembly with adjoining parts of a spray nozzle.

10. The apparatus of claim 1, wherein the body comprises at least one mechanism configured to restrict rotational motion of the flow regulator to be between the first rotational position and the second rotational position.

11. The apparatus of claim 10, wherein the said mechanism comprises at least one step in a sidewall of the chamber.

12. The apparatus of claim 1, wherein the lever comprises at least one top portion configured to be pushed by a user.

13. The apparatus of claim 1, wherein the lever comprises anti-slip grooves.

14. The apparatus of claim 1, wherein the at least one extension portion comprises at least one through hole configured to connect to a positioning tip of the flow regulator.

15. The apparatus of claim 1, wherein the channel is formed with a partial sidewall of a middle section of the flow regulator and is a portion of a cylindrical shape.

16. A nozzle comprising the apparatus for flow control and shutoff of claim 1, a nozzle body, a nozzle inlet and a nozzle head, wherein the apparatus is disposed in a chamber of the nozzle body.

* * * * *